March 24, 1936.　　　　C. SAUZEDDE　　　　2,034,732
BRAKE
Filed Sept. 30, 1929　　　3 Sheets-Sheet 1

Inventor
CLAUDE SAUZEDDE
by Harness, Dickey & Pierce
Attorneys.

March 24, 1936.  C. SAUZEDDE  2,034,732
BRAKE
Filed Sept. 30, 1929   3 Sheets-Sheet 2

Inventor
CLAUDE SAUZEDDE
by Harness, Dickey & Pierce
Attorneys.

March 24, 1936.  C. SAUZEDDE  2,034,732
BRAKE
Filed Sept. 30, 1929  3 Sheets-Sheet 3

Inventor
CLAUDE SAUZEDDE
by
Harness, Dickey & Pierce
Attorneys

Patented Mar. 24, 1936

2,034,732

UNITED STATES PATENT OFFICE 2,034,732

BRAKE

Claude Sauzedde, Detroit, Mich., assignor to Detroit Hydrostatic Brake Corporation, a corporation of Michigan Application September 30, 1929, Serial No. 396,106

19 Claims. (Cl. 188—152)

This invention relates to wheels and brakes and particularly to a novel brake mechanism which may be formed as a unit with the wheel, the principal object being the provision of a new and novel construction of light weight, effective in use, and of long life.

Another object is to provide a wire wheel having a hub forming a drum for brake mechanism.

Another object is to provide a brake drum construction forming the hub of a wire wheel and provided with means thereon serving the dual function as means for increasing the radiation of heat from the drum and serving as anchoring means for the spokes.

Another object is the provision of a braking device having the advantages of distributing the heat energy due to braking operations into a much greater area of braking surface and external drum surface than in conventional constructions.

Another object is the provision of a brake drum made of two halves secured together to form a unitary shell of approximately spherical shape resulting in maximum rigidity and strength.

Another object is the provision of a brake drum forming at the same time a hub and bearing casting of symmetrical relation to the axle, the wheel rim and the center line of the tire.

Another object is the provision of a brake and brake mechanism located in the vertical center line of a tire and including a pair of cone-like brake shoes operating axially of the axle against an element forming at the same time a brake drum and a wheel hub.

Another object is the provision of a brake mechanism so arranged as to positively seal the mechanism against the entrance of foreign matter.

Another object is the provision of a brake mechanism comprising a pair of axially aligned and oppositely axially movable cone-shaped brake elements, and a brake drum having opposed conical faces engageable therewith.

Another object is to provide a brake mechanism comprising a pair of opposed cone-like shoe members and a brake drum co-operable therewith, together with balanced means for forcing the shoes against the drum.

Another object is the provision of a brake comprising a pair of oppositely movable portions having an expandible element positioned therebetween and so arranged that upon expansion of said element said portions are urged outwardly into contact with their cooperating drum.

Another object is the provision of a hydrostatic system centrally located inside of and between a pair of oppositely movable brake shoes and insulated from heat transfer and from contact with foreign matter.

Another object is the provision of a brake mechanism including a pair of oppositely movable circular brake elements having three expansible chambers located between them at intervals of 120 degrees, means being provided for causing expansion of the chambers in both directions whereby to force the elements away from each other and against their respective braking surfaces with equal pressure.

Another object is the provision of a rubber chamber cooperating with the brake element to move it into brake applying position, the rubber chamber being normally maintained under a predeformed position.

A further object is the provision of certain novel details of construction that will be specifically pointed out or will be apparent in the following description.

The above being among the objects of the present invention, same consists in certain novel features of construction and combinations of parts to be hereinafter described with reference to the accompanying drawings, and then claimed, having the above and other objects in view.

In the accompanying drawings, which illustrate the suitable embodiment of the present invention, and in which like numerals refer to like parts throughout the several different views, Fig. 1 is a vertical sectional view taken axially through a wheel and brake.

Figure 1:
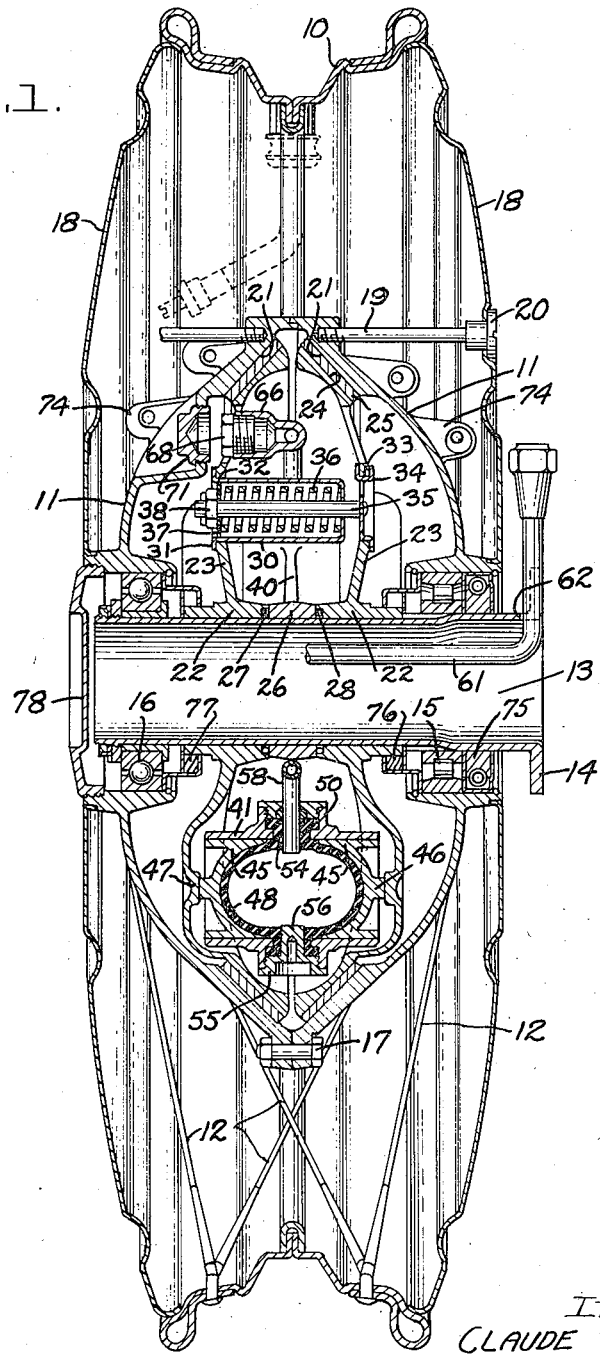

Referring to the accompanying drawings, I show a wheel having a rim 10, a hub made up of a pair of oppositely disposed substantially semi-spherical members 11, and spokes 12 connecting the rim and hub. The construction of the rim and the particular method of lacing the spokes are the subject matter of separate applications filed by me but are not essential to the operativeness or desirability of the broader aspects of the present invention. The particular wheel shown is designed primarily for use in connection with airplanes, although it will be obvious that it may be applicable as shown, or with suitable and obvious changes, to motor or other vehicles. The wheel is provided with a tubular stub axle 13 provided with a radial flange 14 at one end thereof permitting its securement to any suitable supporting member. The axle 13 carries bearings 15 and 16, which in turn carry the combined hub and brake drum members 11, which are shown as being secured together by the bolts 17. The sides of the wheel may be provided with fairing plates 18 if desired, these fairing plates being shown as secured in position by the studs 19 threaded into the members 11 and receiving on their outer ends the nut members 20 co-operating with the plates 18.

In forming the combined hub and drum members 11 in substantially semi-spherical form and securing them together at their open faces I provide a member of great strength and rigidity for the amount of material required, and this feature adds great strength to the wheel itself. The combined hub and drum is provided interiorly thereof with a pair of opposed cone-like brake surfaces 21, one surface being formed in each half 11 and concentric with the axis of the wheel. Interiorly of the combined hub and drum and axially slidable but relatively non-rotatable upon the stub axle 13 is a pair of brake elements, each comprising a hub portion 22, a spider or web portion 23, and an outer cone-shaped surface 24 complementary to the corresponding surface 21. The hubs 22 are preferably splined to the axle 13 as shown. The surfaces 24 are each provided with friction facing 25 of conventional construction securely fastened thereto. The friction facing 25 may, of course, be secured to the faces 21 instead of the faces 24 but the arrangement shown is preferable, as will hereinafter be obvious, in order to prevent any substantial amount of heat transfer into the webs 23 during operation of the brake.

Between the hubs 22 on the axle 13 is positioned another hub 26 which acts as a stop for limiting movement of the hubs 22 towards each other and also serves to properly locate the movable brake elements when these elements are in inoperative position. The hub 26 is maintained against axial movement relative to the axle 13 by a pair of split ring members 27 engaging opposite sides thereof and fitting in peripheral grooves 28 formed in the splined portion of the surface of the axle 13, and it is maintained against relative rotation on the axle 13 by being splined thereto as shown.

Figure 2:
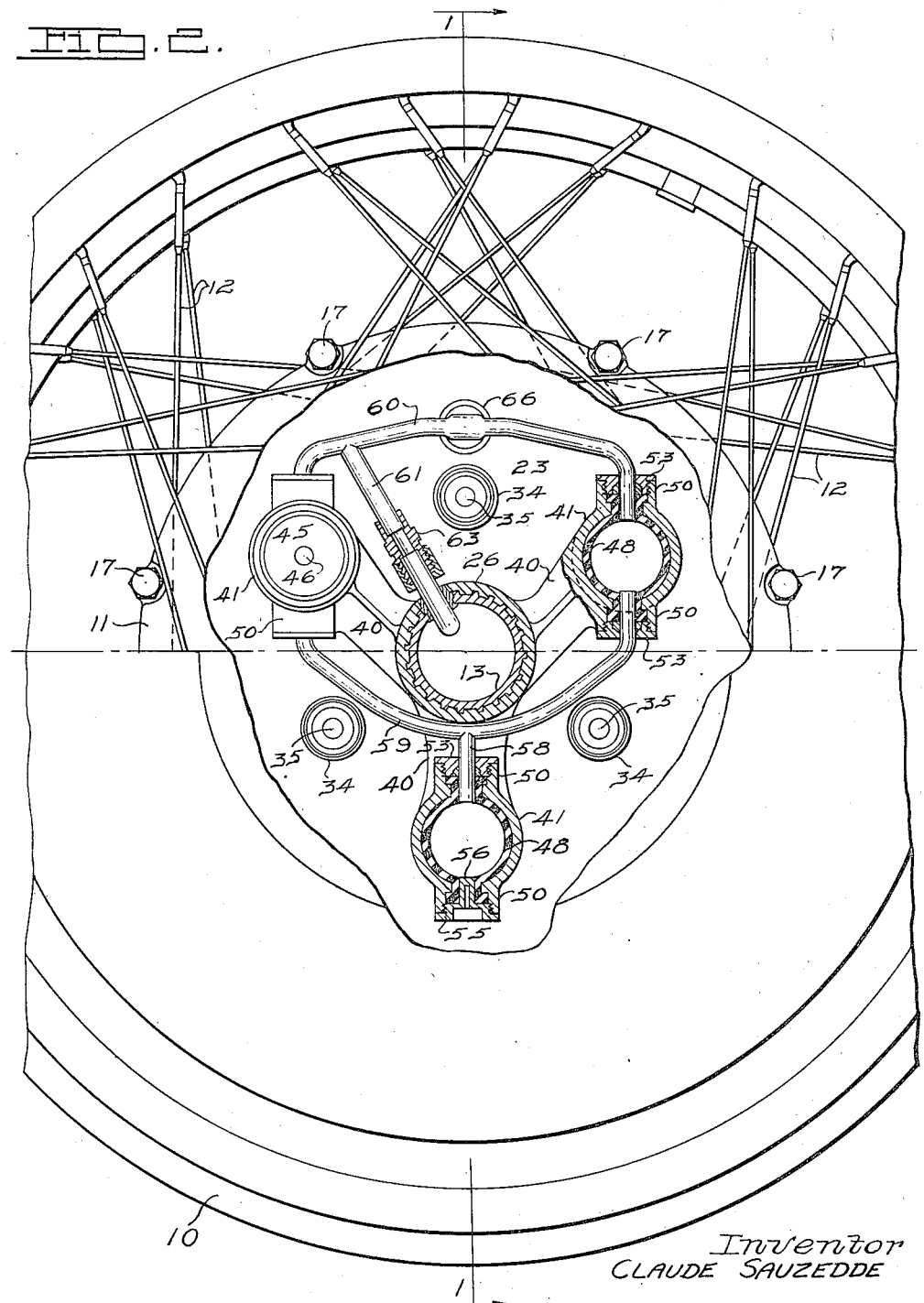
Fig. 2 is a fragmentary side view of the wheel and brake shown in Fig. 1, the fairing for the wheel being removed, part of the brake drum being broken away, and part of the mechanism being shown in vertical section taken in a plane parallel with the plane of the wheel.
Figure 3:
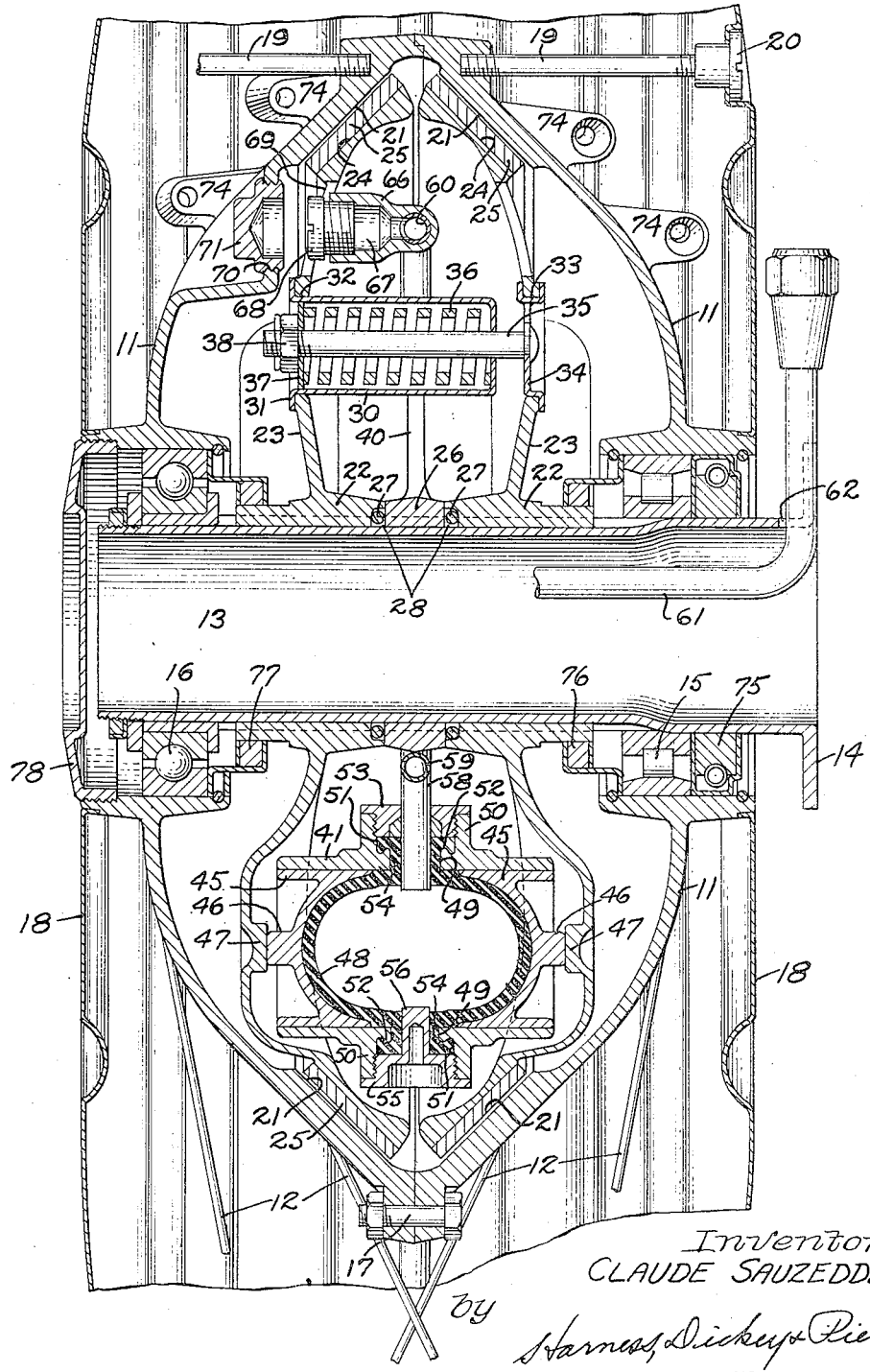
Fig. 3 is an enlarged fragmentary vertical sectional view taken axially through the wheel.

Means are provided for constantly urging the movable brake elements toward each other as follows: A cup-shaped member 30 having an outwardly turned flange 31 at one end thereof is inserted through an opening 32 in one of the webs 23 and in axially parallel relation with respect to the axle 13, the flange 31 bearing against the outer face of the web 23 and limiting inward movement of the member 30 with respect to such web. An opening 33 is provided in the opposite web 23 in alignment with the opening 32 and is provided with a flanged washer 34 serving as a stop for the bolt 35 which extends through the bottom of the member 30 and to a point adjacent the open ends of the member 30. A coil spring 36 is held under compression between the bottom of the cup 30 and the washer 37 maintained against axial movement on the end of the bolt 35 by means of the nut 38, the washer 37 being slidably received within the cup 30. The spring 36 thus serves to constantly urge the movable brake elements towards each other and against the hub 26. Three of these spring assemblies are preferably employed as indicated in Fig. 2 so that their action is equally distributed around each of the movable brake elements.

The hub member 26 is provided with a radially extending web 40 on which is formed at intervals of preferably 120 degrees, and in equally outwardly spaced relation with respect to the axle 13, three cylinders 41 having their axes disposed parallel to the axis of the axle 13. These cylinders are open at both ends and within each end is slidably received a piston 45. The pistons 45 are preferably formed of a non-corrosive material obviating the necessity of lubrication, such as a graphite-bronze or other suitable composition. The inner face of each piston 45 is preferably formed concave and of substantially semispherical shape. Centrally formed on the outer face of each piston 45 is a boss 46 which is adapted to bear against a co-operating boss 47 formed on the inner face of the web 23 of the corresponding movable brake element. Within each cylinder 41 and filling the space between each of the pistons 45 is an expansible member 48 preferably formed of rubber or rubber composition. When formed of rubber this member 48 is preferably so proportioned as to be maintained under a pre-deformed or partially collapsed condition when the brake mechanism is in inoperative position, and so proportioned that when the brake has moved to operative position with the brake linings 25 substantially completely worn away, the material from which the member 48 is formed will even then be free of any stretching or expanding fatigue.

Each cylinder 41 midway between its ends is provided with openings 49 in its upper and lower walls, such openings extending through bosses 50 preferably provided therefor. The openings 49 are enlarged as at 51 so as to form a shoulder 52 therein. The member 48 is provided with centrally apertured projecting portions 54 which are received within the corresponding openings 49.

The lower opening 49 in the lower cylinder 41 and the corresponding opening in the corresponding portion 54 are closed by a plug member 55 which is threaded into the corresponding boss 50 and is provided with an extension 56 received within the opening in the corresponding projecting portion 54 of the member 48. The projection 56 closes the opening in the co-operating projecting portion 54 of the member 48 and the material from which the member 48 is made is compressed between the plug 55 and the shoulder 57. This not only clamps the member 48 against axial movement relative to the cylinder 41 but also serves to seal the member 48 against leakage through the lower portion thereof.

Projecting down through the upper of the portions 54 for the lower cylinder 41 and into the interior of the corresponding member 48 is a tube 58. A nut member 53 is received around the tube 58 and threads into the upper end of the boss 50, compressing the material of the portion 54 against the corresponding shoulder 52 and about the tube 58 within the opening 49, and thus prevents possibility of leakage between the tube 58 and the corresponding portion 54. Referring to Fig. 2, it will be noted that the tube 58 is connected at its upper end with a tube 59 which extends in either direction therefrom. The ends of the tube 59 extend upwardly through the bottom of the remaining cylinders 41 and into the corresponding member 48 carried thereby, such ends being sealed against leakage in the same manner that the tube 58 is sealed against leakage with respect to the lower member 48. Another tube 60 which serves as a bleeder tube and which completes the circuit between the cylinders 41 is connected between the upper sides of the upper cylinders 41, its ends extending downwardly through such cylinders into the corresponding members 48 therein and are sealed against leakage in the same manner as the tube 58 with respect to the lower cylinder 41. The tube 60 is provided with a branch passage 61 which extends radially inwardly of the wheel through the axle member 13 and then axially inwardly of the wheel to adjacent the flange 14, at which point it is bent outwardly through a notch 62 provided at that end of the axle member. The tube 61 is preferably broken between the axle member 13 and the tube 60 and secured together at this point by a separable connection such as 63 in order to permit greater ease in assembly and disassembly. The tube 61 may be led to any suitable apparatus for introducing fluid under pressure whereby such fluid may be introduced to the interior of the various members 48. Any of the conventional types of master compressor mechanism employed in conventional hydraulic brake apparatus may be employed for producing the pressure required.

The upper tube 60 is preferably so bent that its center portion is materially higher than the end portions thereof. At the highest point thereof is provided a bleeder fitting 66 connecting with the interior of the tube 60 and is provided with an opening 67 normally closed by the plug 68. The web 23 of the movable brake element on the side adjacent the plug 68 is provided with an opening 69 through which the plug 68 projects, and the corresponding drum half 11, in alignment with the plug 68 and opening 69, is provided with a corresponding opening 70 closed by the removable plug 71. The purpose of this part of the mechanism is that when a liquid is employed for expanding the members 48 any air that may find its way into the brake mechanism will rise to the uppermost point in the tube 60 and by removing the plug 68 such air may be allowed to escape, or be bled, from the system. Provision of the plug 71 permits the plug 68 to be removed without the necessity of disassembling the brake mechanism. By connecting the various tubes connecting the cylinders 41 through the tops and bottoms of the respective cylinders 41, the ready escape of any air that may find its way into the system to the upper portion of the tube 60 is assured.

The operation of the brake will be obvious from the above description and may be briefly stated as follows: Upon the application of fluid under pressure to the interiors of the various members 48 through the tubes 61, 60, 59 and 58, the pressure will tend to expand the members 48 and force the pistons 45 outwardly. Inasmuch as the same pressure will be transmitted to all of the members 48, all of the pistons 45 will be urged outwardly under the same force. In moving outwardly, the pistons 45 bear against the corresponding movable brake elements through the corresponding bosses 46 and 48 and force the movable brake elements outwardly against the force of the springs 36 until the friction facings 25 are forced against the co-operating braking surfaces 21. The balance of pressure in the various members 48 will thus insure both brake elements engaging the corresponding braking surfaces with equal effort.

By forming the brake surfaces and the braking elements with conical engaging surfaces it will be apparent that I am enabled to obtain a mechanical advantage resulting in a greater unit pressure between brake elements and the co-operating braking surfaces on the drums than is possible in conventional constructions employing a like actuating pressure. In fact, I obtain approximately seventy percent greater contact area than in a conventional type of brake of the same diameter. This permits me to use a relatively smaller, and therefore lighter, brake than is conventionally employed for exerting a predetermined braking effect. Also, due to the nearly spherical construction of the brake drum and the conical formation of the brake shoes, there is no tendency for the shoes and drums to distort under relatively great pressures as in conventional constructions, and in arranging the brake elements in back to back relationship and forcing them apart in opposite directions into engagement with the drum, no axial force is set up between the drum assembly and the axle. As soon as the pressure of the fluid in the various tubes is relieved the springs 36 will return the brake elements to inoperative position as shown in the drawings.

With this construction I prefer to form the drum halves 11 of a light metal or metal alloy of relatively high heat conductive properties whereby the heat generated by the application of the brakes will have a relatively rapid flow over the halves 11 and by thus transmitting the heat to a relatively large area exposed to the air to thus prevent an undue heating of the brake. Furthermore, when I provide the lugs 74 for anchoring the inner ends of the spokes 12 to the combined hub and drum member, the lugs 74 serve as fins which thus act as increased heat radiating surfaces on the drum and further act to reduce the temperature of the drum.

The space between the inner edge of the inner drum member 11 and the axle 13 is preferably sealed with a ring 75 which may be of the type conventionally employed for sealing bearings against the entrance of dust and dirt or escape of lubricant. A similar ring 76 is preferably provided on the inner side of the bearing 15 in order to prevent the possibility of escape of lubricant for the bearing 15 into the interior of the brake drum. Another ring 77 is provided on the inner side of the bearing 16 for the same purpose as the bearing 76. The outer end of the outer hub member 11 may be closed by a cap such as 78. The interior of the combined brake drum and hub is thus completely sealed against the entrance of dust or dirt and this feature adds materially to the life of the brake mechanism.

It will thus be seen that I have provided a brake mechanism incorporating a combined hub and brake drum construction so formed as to provide a structure of maximum strength and minimum weight, that the brake mechanism includes a pair of oppositely movable brake elements so constructed as to realize the greatest efficiency and effect with minimum operating effort, of maximum heat dissipating qualities, and completely sealed against the entrance of dirt and dust or other foreign matter.

While I have shown and described the present brake mechanism as being in combination with a wire spoke type of wheel, it will be apparent that mere elimination of outer parts provides a wheel construction in which the wheel hub or brake drum itself substantially serves as the entire wheel without the necessity of providing any spoked structure or its equivalent.

Formal changes may be made in the specific embodiment of the invention described without departing from the spirit and substance of the broad invention, the scope of which is commensurate with the appended claims.

What I claim is:

1. In combination, a fixed shaft, outer brake surface elements rotatably mounted upon the shaft with the brake surfaces remote from the shaft, non-rotatable brake means mounted for axial movement in opposite direction between the first mentioned means and splined to the shaft, a rigid support rigidly fixed upon the shaft between the brake means and having fluid pressure means upon opposite sides thereof for actuating the non-rotatable brake means, said support being arranged to locate the fluid pressure means intermediate and radially spaced from the brake surfaces and the shaft, and resilient means for urging said means toward the support.

2. In combination, a non-rotatable shaft, axially spaced outermost elements rotatably mounted upon the shaft, a pair of axially oppositely movable brake elements non-rotatably splined upon the shaft for engagement with the first mentioned brake elements, a rigid radially extending support rigidly fixed upon the shaft between the slidable brake elements, a plurality of pressure cylinders rigidly secured to the support in axial parallelism with respect to the axle and having fluid actuated pistons projecting from opposite ends thereof for actuating the slidable brake elements and resilient means for urging the slidable brake elements toward the end of the cylinders.

3. In a brake mechanism, in combination, a brake drum having a pair of opposed conical surfaces spaced radially from the drum axis, a pair of movable brake elements positioned between said surfaces and provided with surfaces complementary thereto, an open ended cylinder positioned radially intermediate the conical surfaces and the drum axis and having portions rigidly fixed positioned between said elements, and means in said cylinder also having portions rigidly fixed, cooperable with said elements for urging them apart.

4. In combination, a brake drum having a pair of axially opposed braking surfaces, a pair of oppositely movable brake elements positioned between said surfaces and having surfaces complementary thereto, a plurality of cylinders rigidly fixed within said drum symmetrically arranged relative to the axis thereof, a pair of axially oppositely movable pistons in each of said cylinders cooperable with the corresponding of said elements, and elastic expansible elements having portions rigidly fixed for urging each pair of said pistons apart whereby to force said elements into contact with said braking surfaces.

5. In combination, a brake drum having a pair of axially opposed braking surfaces, a pair of axially oppositely movable brake elements positioned between said surfaces and having surfaces complementary thereto, a plurality of axially aligned cylinders rigidly fixed between said elements, a piston in each end of said cylinders cooperable with said elements, an expansible member having portions rigidly fixed within said cylinder between said pistons, and a pressure connection for said expansible member and spring means drawing the cylinders toward each other.

6. In combination, a brake drum having a pair of axially opposed braking surfaces positioned remote from the brake axis, a pair of axially oppositely movable brake elements positioned between said surfaces and having surfaces complementary thereto, an axially aligned cylinder rigidly fixed to the axle supporting the brake drum and supported between said elements intermediate and radially spaced from the surfaces and the drum axis, a piston in each end of said cylinder cooperable with said elements, a hollow rubber bulb having portions rigidly fixed within said cylinder bearing against said pistons, and a pressure connection for the interior of said bulb.

7. In combination, a brake drum rotatably mounted upon a shaft and having a pair of axially opposed braking surfaces positioned remote from the shaft, a pair of axially oppositely movable brake elements positioned between said surfaces and having surfaces complementary thereto, means constantly urging said brake elements towards each other, an axially disposed cylinder fixedly carried by the shaft and located between said brake elements intermediate and radially spaced from the surfaces and the shaft, pistons in the ends of said cylinder normally urged towards each other by said means, a rubber bulb having portions rigidly fixed within said cylinder normally maintained in partially collapsed condition by said pistons, and a pressure connection for the interior of said bulb, said movable brake elements being slidably splined upon the shaft.

8. In combination, a tubular axle, a hollow wheel rotatably mounted on the axle and having axially separated sides, a pair of brake discs within the wheel and splined to the axle for axial movement relative thereto, said discs and wheel having cooperating braking surfaces within the wheel remote from the axle, means for moving the discs apart, said means being adapted to apply the disk-moving pressure within a limited zone of the disks intermediate and spaced from the axle and braking surface zones of the disks, and means for insuring substantially equal spacing of the braking surfaces on the discs from the braking surfaces on the wheel during the time the brakes are not in use.

9. In combination, a tubular axle, a wheel of hollow character rotatably mounted on the axle and having axially separated sides, a pair of brake discs within the wheel and splined to the axle for axial movement relative thereto, said discs and wheel having cooperating braking surfaces within the wheel remote from the axle, means for moving the discs apart and into braking contact with the wheel braking surfaces, said means being adapted to apply the disk-moving pressure within a limited zone of the disks intermediate and spaced from the axle and braking surface zones of the disks, and means for normally preventing movement of the discs as a unit in either direction along the axle.

10. In combination, a tubular axle, a hollow wheel rotatably mounted on the axle and having axially separated sides, a pair of brake discs within the wheel and splined to the axle for axial movement relative thereto, said discs and wheel having cooperating braking surfaces within the wheel remote from the axle, disc centering means on the axle between the discs and fixed against axial movement thereon, and means mounted on the last means for moving the discs into braking contact with the wheel, said means being adapted to apply the disk-moving pressure within a limited zone of the disks intermediate and spaced from the axle and braking surface zones of the disks.

11. In combination, a tubular axle, a hollow wheel rotatably mounted on the axle and having axially separated sides, a pair of brake discs within the wheel and splined to the axle for axial movement relative thereto, said discs and wheel having cooperating braking surfaces within the wheel remote from the axle, disc centering means fixed on the axle between the discs, for insuring separation of both discs from the braking surfaces on the wheel, fluid operated means mounted on the last means for moving the discs into braking contact positions, said means being adapted to apply the disk-moving pressure within a limited zone of the disks intermediate and spaced from the axle and braking surface zones of the disks, and means for returning the disks to their centered position following such braking contact.

12. In a wheel braking mechanism, the combination with a hollow axle, a hollow wheel mounted on the axle and having interior braking surfaces, a pair of discs within the wheel and carried by the axle for axial movement thereof, each of said discs having a braking surface for coacting with a braking surface on the wheel remote from the axle, actuating means within the wheel for forcing the discs in opposite directions and into braking contact with the wheel braking surfaces, said means bring adapted to apply the disk-moving pressure within a limited zone of the disks intermediate and spaced from the axle and braking surface zones of the disks, and spring means for normally urging the discs out of such braking contact positions.

13. A combined wheel and brake formation adapted for service with an axle carrying a terminal zone of a fluid pressure line of a hydraulic braking system, said wheel including a hub section and a tire section carried thereby and adapted to carry the tire, said hub-section being constructed and arranged to complete a chamber substantially symmetrical to a plane normal to the axle and extending through the tire-section, with the hub section remote radially from the tire section, side walls of the hub section carrying internal annular braking surfaces, a spider fixed to the axle within said chamber, brake mechanism within said chamber and including an expansible chamber having major and minor axes and having operative communication with said terminal zone when the wheel is in position on the axle, said expansible chamber being supported by the spider with its minor axis zone definitely and fixedly positioned by the spider to prevent expansion of the expansible chamber in the direction of such minor axis, the direction of expansion of the expansible chamber being normal to such plane and in correspondence with the direction of the major axis of the expansible chamber, brake shoe disks supported by and movable in the direction of the axis of the axle into and out of contact with the braking surfaces, the brake-applying movement of the disks being provided by the expansible chamber and means tending to yieldingly restrain the disk movements in the direction of brake shoe application.

14. A formation as in claim 13 characterized in that the expansible chamber is positioned to cooperate with the disks in a limited zone of the latter intermediate and spaced from the axle and braking surface zones of the disks.

15. A formation as in claim 13 characterized in that the expansible chamber and the restraining means are interposed between the disks.

16. A formation as in claim 13 characterized in that the expansible chamber is in the form of a pair of alined cylinders the axis of which extends substantially parallel with the axle axis, a piston for and movable within each cylinder and adapted to contact with the adjacent disk, and an expansible member interposed between the pistons.

17. A formation as in claim 13 characterized in that the expansible chamber is in the form of a pair of axially-alined cylinders the axis of which extends substantially parallel with the axle axis, a piston for and movable within each cylinder and adapted to contact with the adjacent disk, and an expansible member interposed between the pistons, the pistons having their inner faces curved to form pockets to receive the member.

18. A formation as in claim 13 characterized in that the expansible chamber is carried by the spider intermediate and spaced from the inner and outer radial zones of the hub-section chamber.

19. In a wheel braking mechanism, and in combination, a hollow wheel mounted on a hollow axle, said wheel including walls of a closed casing opposing walls of which present annular braking surfaces located remote from the axle, a pair of disks within the casing and carried by the axle non-rotatively relative to the axle, said disks each having a braking surface complemental to and positioned opposite said braking surfaces of the casing, fluid-actuated means within the casing for forcing said disks in opposite directions to produce braking coaction between the respective braking surfaces, said fluid-actuated means having operative connection with a source of fluid pressure supply with the connections including a fluid conduit within the axle, said fluid-actuated means co-operating with the disks intermediate and radially spaced from the braking surfaces and the axle, and spring means for holding said brakes normally out of braking contact.

CLAUDE SAUZEDDE.